W. E. ALEXANDER.
BRUSH MAKING MACHINE.
APPLICATION FILED JULY 31, 1916.
1,227,562.
Patented May 29, 1917.
3 SHEETS—SHEET 1.
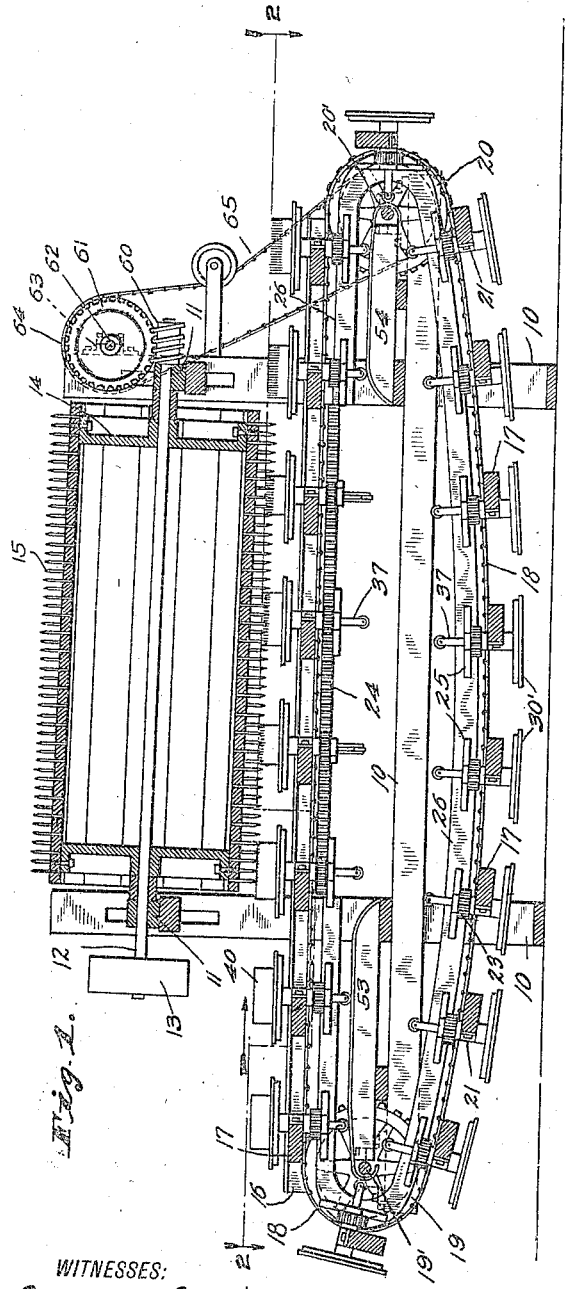
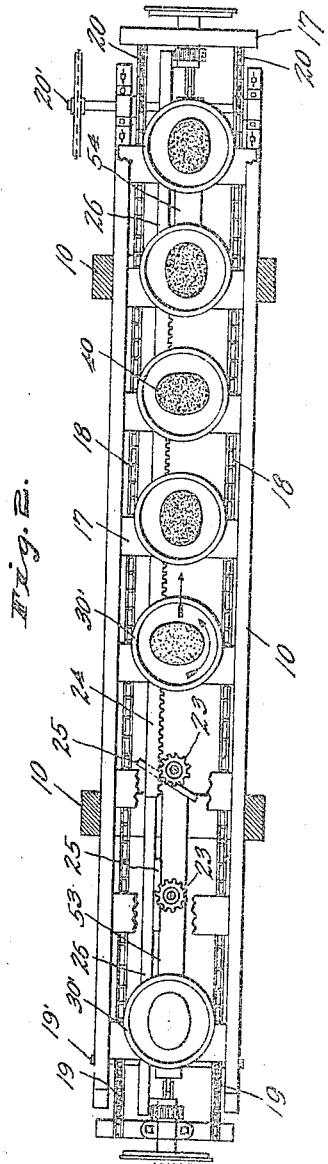
WITNESSES:
Frank A. Fahle
Louise Bennett.
INVENTOR
William E. Alexander,
BY
Hood & Schley
ATTORNEYS W. E. ALEXANDER.
BRUSH MAKING MACHINE.
APPLICATION FILED JULY 31, 1916.
1,227,562.
Patented May 29, 1917.
3 SHEETS—SHEET 2.
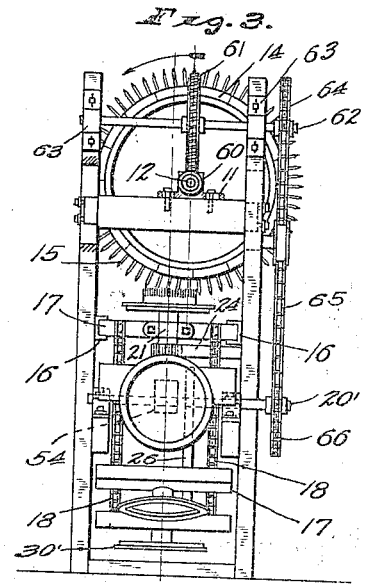
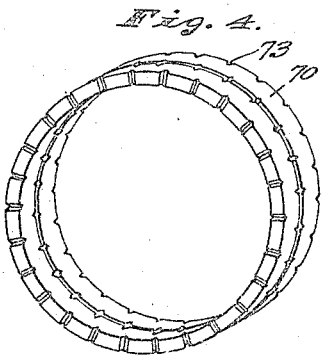
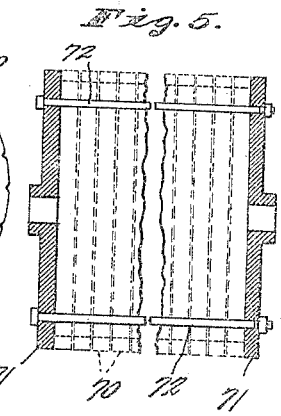
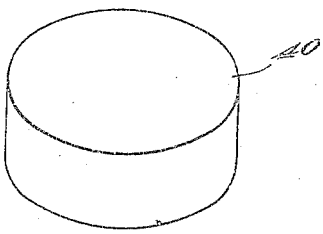
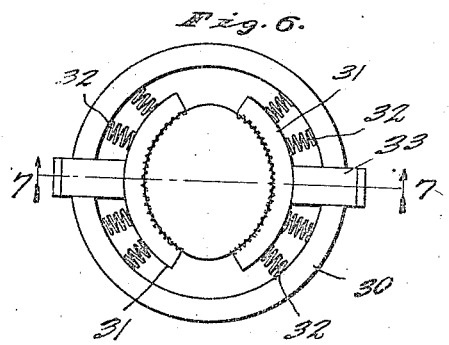
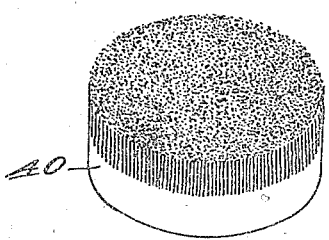
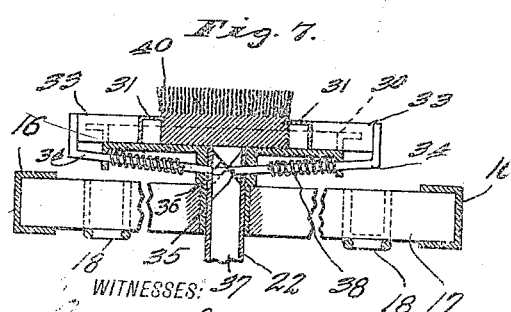
WITNESSES:
Frank A. Fable
Louise Bennett
INVENTOR
William E. Alexander,
BY
Howard Schley
ATTORNEYS

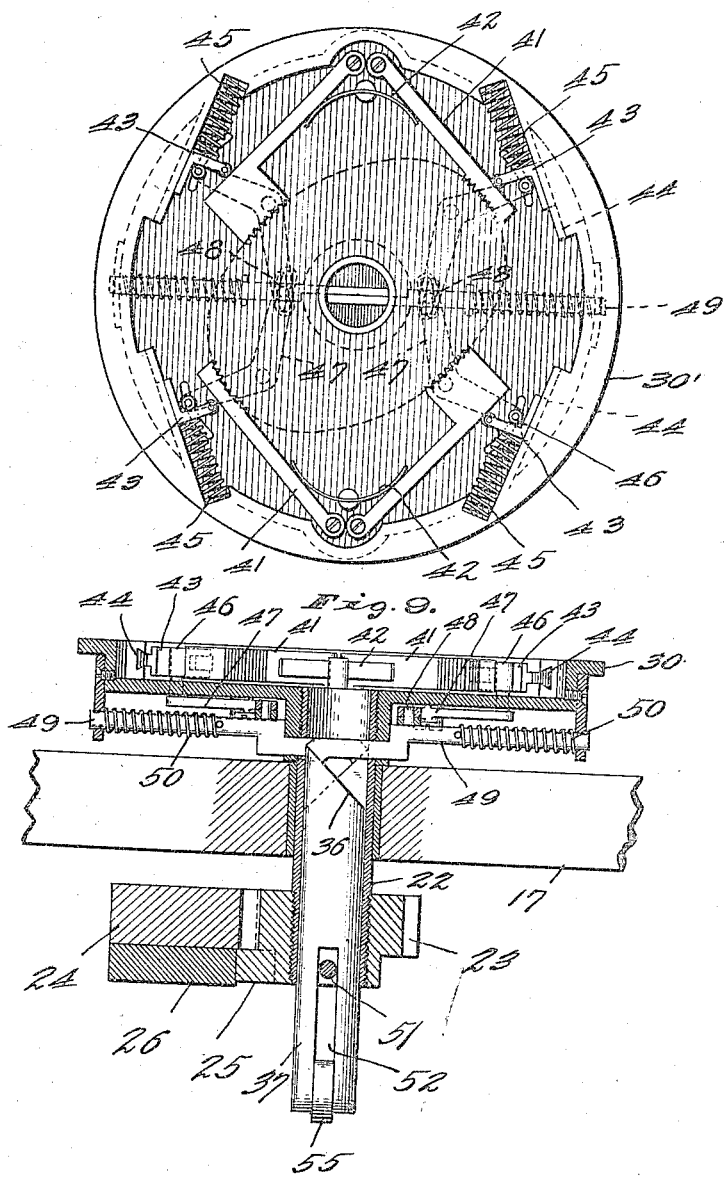

UNITED STATES PATENT OFFICE.

WILLIAM E. ALEXANDER, OF HAZELRIGG, INDIANA.

BRUSH-MAKING MACHINE.

1,227,562.                Specification of Letters Patent.        Patented May 29, 1917.

Application filed July 31, 1916. Serial No. 112,228.

*To all whom it may concern:*

Be it known that I, WILLIAM E. ALEXANDER, a citizen of the United States, residing at Hazelrigg, in the county of Boone and State of Indiana, have invented a new and useful Brush-Making Machine, of which the following is a specification.

The object of my invention is to produce a machine capable of automatically producing brushes from blocks of fibrous wood, such as palmetto, the construction and operation being such that portions of the intermediate pith of blocks of the wood will be removed, thus exposing the ends of the tough fibers, which remain embedded in the undisturbed pith.

Brushes of this type have long been produced by hand, but the expense of production in that manner has been too great to make such brushes commercially practical.

The accompanying drawings illustrate my invention. Figure 1 is a vertical longitudinal section of a machine embodying my invention; Fig. 2 a horizontal section on line 2—2 of Fig. 1; Fig. 3 an elevation of the discharge end of the machine; Fig. 4 a fragmentary perspective of two of the rings of a modified tooth head; Fig. 5 an axial section of the clamping portions of a tooth head formed of the rings shown in Fig. 4; Fig. 6 a plan of one form of block-clamping head; Fig. 7 a section on line 7—7 of Fig. 6, and also including the adjacent portion of the carrying chain; Fig. 8 a plan of another form of block-clamping head; Fig. 9 an axial section of the structure shown in Fig. 8; Fig. 10 an elevation of one of the pith-removing teeth; Fig. 11 a perspective view indicating the initial block from which the brush is to be formed; and Fig. 12 a perspective view of the completed brush.

In the drawings, 10 indicates a suitable supporting frame structure provided with two vertically adjustable bearings 11, 11, in which is journaled a shaft 12 carrying a suitable driving pulley 13. The shaft 12 carries a drum 14 which is provided with a large number of radially-projecting teeth 15 arranged in a staggered relationship.

Mounted below drum 14 and extending lengthwise of the machine, are two channel guides 16, 16, arranged to receive the ends of a plurality of cross heads 17 which are carried in spaced relationship by a pair of endless chains 18, 18, supported by sprocket wheels 19 and 20 at opposite ends of the machine. The sprockets 19 and 20 are carried by the shafts 19′ and 20′, respectively, which are supported in suitable bearings adjustably supported upon the machine, so that undesirable slack in the chain 18 will be taken up. Each cross head 17 is provided with a bearing 21 in which is journaled a shaft 22 which is conveniently hollow. The upper end of this shaft carries a block clamping head and the lower end carries a pinion 23 adapted to mesh with a rack bar 24 arranged along a portion of the length of one of the channels 16 so as to be successively engaged by the several pinions 23 as chains 18 are moved. Adjacent each pinion 23 is a shoe 25 adapted to engage a stationary cam track 26, the coöperation between the cam track 26 and the shoe 25 preventing rotation of shaft 22.

Any suitable form of block-clamping means may be provided on the block-holding head. In Figs. 6 and 7, I have shown a circular head 30 provided with a pair of segmental clamping shoes 31 urged inwardly by springs 32. Each shoe 31 is provided with a shank 33 which guides it in head 30 and to this shank 33 is attached a rod 34 extended inwardly and provided with a cam-shaped end 35 adapted to be engaged by a cam face 36 formed upon the upper end of a rod 37 mounted in the hollow shaft 22 and axially movable therein. Springs 38 acting upon rods 34 assist the springs 32 in urging the heads 31 inwardly to engage the block 40 from which the brush is to be made.

In the form shown in Figs. 8 and 9, the brush block is held between pivoted jaws 41 normally urged outwardly by springs 42. Each of the jaws is urged inwardly by a sliding cam block 43 mounted in guides 44 in head 30′, each cam block being urged in one direction by a spring 45. Each cam block is engaged by a roller 46 carried by a bell crank lever 47, adjacent ends of said levers in pairs being engaged by a pin 48 projecting through suitable slots formed in the bell crank arms. Each pin 48 is carried by a radially movable plunger 49 normally urged inwardly by a spring 50. The inner end of each plunger 49 is arranged to be engaged by a cam face 36 of the rod 37. Rotation of rod 37 within shaft 22 is prevented by a cross pin 51 extending through a slot 52. Vertical reciprocation of rod 57 is accomplished by engagement with cams 53 and 54, respectively, arranged at the opposite ends of the machine, each rod 37 carrying a roller 55 at its lower end arranged to engage the cams 53 and 54.

Bearings 11 are vertically adjustable in order that the distance between the ends of the teeth 15 and the block clamps may be adjusted and also so that the shaft 12 may be set at a slight angle to the plane of guides 16, so that, as the brush blocks progress through the machine, the teeth 15 will dig deeper and deeper into said blocks.

The bearings 11 are also laterally adjustable relative to the medial plane of the block clamps, as indicated in Fig. 3, and the vertical medial plane of shaft 12 is laterally offset relative to the vertical medial plane of the block holders, as indicated in Fig. 3, so that the teeth 15 will at all times enter the upper face of the brush block, as distinguished from entering the side or vertical face of such block, and will emerge from the brush block at its side instead of from the upper face.

Shaft 12 carries a worm 60 which meshes with a worm wheel 61 carried by a shaft 62 supported in vertically adjustable bearings 63. Shaft 62 also carries a sprocket wheel 64 which carries a sprocket chain 65 engaging a sprocket wheel 66 on shaft 20', the arrangement being such that upon rotation of drum 14, chains 18 will be slowly advanced in the direction indicated by the arrow in Figs. 1 and 2.

Any suitable means may be provided for mounting the raker teeth 15 in the drum 14. In Figs. 4 and 5, I show a series of rings 70 adapted to be clamped between heads 71 by clamping bolts 72. Each of the rings 70 is provided on each end with radial notches 73 adapted to receive and clamp the raker teeth 15 and by a suitable relative setting of the various rings any desired staggering of the teeth may be obtained.

The raker teeth are preferably somewhat rounded and blunt at their ends so as to remove the pith from the brush blocks without cutting or breaking the tough fiber.

The operation is as follows: As the brush clamps successively reach the left hand end of the machine (Fig. 1), cam 53 is engaged by the roller 55 so that the clamping jaws are separated to permit the placing of a brush block in the clamping head. Just before the brush blocks reach the initial end of the drum 14, the end of cam 53 is reached, and the brush blocks are thus firmly clamped in the clamping head. At about the time the brush block reaches the initial teeth of the drum 14, pinion 23 engages rack 24 and shoe 25 leaves cam 26 so that, at about the time the raker teeth 15 begin to engage the brush block, the said brush block is rotated about an axis substantially at right angles to the line of transportation of the brush block and substantially, although not quite, at right angles to the axis of the drum 14.

As the blocks proceed through the machine, the teeth 15 enter the upper face of the block, gouge out a small quantity of pith and discharge it from the side of the block, the teeth entering more and more deeply until, when the blocks reach the final end of the drum, a desired depth of digging has been reached and a desired length of the embedded tough fibers of the block exposed. As the brush block emerges from beneath drum 14, cam 54 is reached by roller 55 and the completed brush is released from the clamping head, so that it may be removed.

I find in operation that an eminently satisfactory brush can be produced from wood such as palmetto, the tough fibers being thoroughly exposed and unbroken.

I claim as my invention:

1. A brush making machine comprising a clamping member for the block from which the brush is to be made, a raking member adapted to engage the block and remove portions laterally therefrom, and means for producing relative translatory and rotative raking movement between the clamping member and raking member during raking operation.

2. A brush making machine comprising a rotary raker member provided with a plurality of raker teeth, a clamping member adapted to receive and hold the block from which the brush is to be made, means for shifting said clamping member relative to the raker member, and means for rotating the clamping member during raking operation.

3. A brush making machine comprising a rotary raking member provided with a plurality of raker teeth, cross head guides arranged longitudinally of said raker member and at an angle to the axis thereof, a cross head mounted in said guides, a block clamp journaled upon said cross head at an angle to the guide plane, and means for causing rotation of the block clamp upon movement of the cross head along its guides during raking operation.

4. A brush making machine comprising a rotary raker member, a guide arranged lengthwise of said raker member and at a slight angle thereto, a cross head arranged to traverse said guide, an endless belt carrying said cross head, a block clamp journaled upon the cross head upon an axis substantially at right angles to the guide plane, block clamping members movably mounted upon said head, a plunger mounted in said head, means arranged between said plunger and the clamping members whereby reciprocation of the plunger will control the clamping members, and cams arranged in the path of transportation of said plunger to shift the plunger.

5. A brush making machine, comprising a cross head guide, a cross head arranged to traverse the same, a clamping head journaled on the cross head substantially at right angles to the guide plane, a rack arranged alongside a portion of said guide, a pinion carried by the clamping head and adapted to mesh with said rack, means for driving the cross head through the guide, and a raker member arranged to traverse material carried by the clamping head.

6. A brush making machine, comprising a rotary raker member, a guide extending axially of said raker member, a cross head mounted in said guide, a brush clamping member rotatably mounted upon the cross head at an angle to the plane of the guide, a pinion carried by said clamping member, a rack for engaging said pinion to rotate the clamping member, an endless carrier for transporting the cross head along the guide, cam faces at the ends of said rack, and a shoe carried by the clamping member and arranged to engage said cam faces to hold the clamping member against rotation during a portion of the transportation of the cross head.

7. A brush making machine comprising a raker member, a block-holding member, and means for relatively rotatively shifting said members and for causing one to approach the other and for causing the raker member to laterally traverse the block-holding member during the relative rotative movement, whereby portions of the material operated upon will be removed at successively greater depths.

8. A brush-making machine comprising a rotary raking member, a rotary block-clamping member rotative about an axis at an angle to the raking member and relative to said member, and means for causing the raker member to gradually dig deeper into the material carried by the block-carrying member.

9. A brush-making machine comprising a block-clamping member, means for rotating the same, a raking member movable transversely of the axis of rotation of the block-clamping member, and means for causing the raking member to gradually dig deeper into the material carried by the block-carrying member during rotation of said block-carrying member.

10. A brush-making machine comprising a rotary raking member provided with a plurality of raker teeth, a cross head guide arranged longitudinally of the raker member, a cross head mounted in said guide, a block-clamp journaled upon said cross head at an angle to the guide plane, and means for causing rotation of the block clamp upon movement of the cross head along its guide during raking operation.

11. A brush-making machine comprising a rotary raking member provided with a plurality of raker teeth, a cross head guide arranged longitudinally of the raker member, a cross head mounted in said guide, a block-clamp journaled upon said cross head at an angle to the guide plane, means for causing rotation of the block clamp upon movement of the cross head along its guide, and means for causing the raker teeth to dig gradually deeper into the material carried by the block clamp.

In witness whereof, I have hereunto set my hand at Indianapolis, Indiana, this 28th day of July, A. D. one thousand nine hundred and sixteen.

WILLIAM E. ALEXANDER.